Patented Oct. 7, 1947

2,428,741

UNITED STATES PATENT OFFICE 2,428,741

CATALYTIC CONVERSION OF HYDROCARBONS

Charles J. Plank, Woodbury, N. J., assignor to Socony-Vacuum Oil Company, Incorporated, a corporation of New York No Drawing. Application November 29, 1944, Serial No. 565,790

2 Claims. (Cl. 196—52)

This invention relates to a process for the catalytic conversion of hydrocarbon oils and is particularly concerned with a novel catalyst for such operations and with the method of manufacturing the novel catalyst.

It is well known that certain combinations of silica and alumina are effective for catalysis of hydrocarbon conversion processes in the nature of cracking, alkylation, polymerization, desulfurization, aromatization, isomerization, etc. These compositions of the prior art are generally predominant in silica and partake of the nature of silica activated by alumina, the percentage of alumina usually being on the order of 10%. I have now found that a very active catalyst may be prepared by depositing silica on porous active alumina to produce a composition in which alumina predominates and thereafter treating the composite with hydrogen fluoride, boron trifluoride or hydrogen fluoride plus phosphoric acid. Since boron trifluoride hydrolyzes to form hydrogen fluoride, it would seem that the latter must inevitably be present in some amounts in any of the treatments according to my invention. The hydrogen fluoride might be reasonably expected to attack silica and remove it, at least in part, from the composite. The activating effect of these agents is, accordingly, difficult to explain. It is known that alumina alone is substantially inactive for cracking of hydrocarbons, yet treatment of silica-alumina composites (in which silica is a minor component) with hydrogen fluoride results in very substantial increases in catalytic activity of the composites for cracking reactions.

I have discovered that an excellent cracking catalyst can be made by properly treating active alumina so as to produce a material which is essentially alumina activated by the presence of relatively minor proportions of other components. In the first place I have found that simply treating active alumina with dilute aqueous or gaseous HF gives a product which has a fair activity as a cracking catalyst. Secondly, treatment of active alumina with HF in the presence of $H_3PO_4$ or subsequent to $H_3PO_4$ gives a better catalyst. In the third place, a catalyst equal to or superior to clay catalysts is obtained by impregnating alumina with a minor proportion of $SiO_2$ (as from a silicic acid sol) and then treating this product with HF, HF and $H_3PO_4$, or $BF_3$. Even without the final step of treating with HF, etc., a fairly good cracking catalyst can be obtained. More silica must be deposited on the alumina, however, to give a moderately good catalyst than is necessary to give a superior catalyst if the HF (etc.) step is included. For example, with only 5–10% $SiO_2$ on the alumina a catalyst giving 50% 410° end point gasoline (neglecting pentanes and lower) can be obtained if the silica-coated alumina is treated with HF, HF and $H_3PO_4$, or $BF_3$. However about 15% $SiO_2$ on alumina will give 35–40% 410° gasoline with no HF (etc.) treatment.

The methods which I have used to coat the alumina with small amounts of silica are four in number. The first was to soak the alumina in solutions of ethyl ortho silicate in ethanol for about 24 hours, then to hydrolyze the adsorbed ethyl silicate, and finally to dry the product. The amount of the ethyl silicate solution used was such that if all the $Et_4SiO_4$ were adsorbed on the alumina, the adsorbed silica would amount to 3–25% of the product. The second method was to disperse finely ground alumina throughout an ethyl ortho silicate solution which was slightly acid and to gel this mixture by adding 1N $NH_4OH$. The gel was then dried and a coating of silica gel over the alumina was thus obtained. By this method quantities of silica varying from the smallest amount required to produce a gel up to 25% are deposited on the alumina. The third and fourth methods are analogous to the first two with the exception that water glass is used instead of ethyl orthosilicate as the source of the silica. In these cases, of course, the product must be washed with $NH_4Cl$ to remove the sodium ions. But when this is done and the $NH_4Cl$ washed out the products are just as good as when ethyl silicate is used. These are, of course, far more economical.

By all these methods alumina coated with silica is produced which has a fairly high activity as a cracking catalyst. However, further activation to produce a superior cracking catalyst can be obtained by treating the silica-coated alumina with HF, HF+$H_3PO_4$, or $BF_3$. In my experiments $BF_3$-etherate was used as the source of $BF_3$, since this represented the simplest method of adding the boron trifluoride.

A procedure of treating alumina exactly opposite to those already described will also produce a cracking catalyst of fairly high activity. This procedure is to treat the alumina with HF, $H_3PO_4$+HF, or $BF_3$ and follow this by coating with $SiO_2$ (as from a silica acid gel prepared from ethyl silicate or water glass).

As a comparison of the activities of these new catalysts of alumina activated by $SiO_2$ and/or fluoride linkages, it should be pointed out that I have obtained yields of 410° end point gasoline (depentanized) of slightly better than 50% with said catalyst if properly prepared, whereas clays which give yields as high as 45% are extremely unusual.

Further objects and advantages of the invention will become apparent from the specific examples set out below. Although any desirable source of active alumina may be used, the specific examples herein are directed to treatment of material sold by the Aluminum Ore Company under the name of "activated alumina"—grade A. The raw active alumina and each of the compositions prepared by treatment thereof were tested as cracking catalysts by passing vapors of Oklahoma City gas oil in contact with the composition at 810° F. and atmospheric pressure. The space velocities (volume of liquid charge per volume of catalyst per hour) and the yield of 410° F. end point gasoline are reported in the table following the examples.

*Example 1.*—Approximately 60 grams of 8–14 mesh active alumina were soaked at room temperature in 100 ml. aqueous HF (2.5%) solution. The supernatant liquid, which was perfectly clear was poured off and the product was then dried for two hours at 212° F. The temperature was then raised to 1000° F. and held at that level for several hours. The dried product had an apparent density of 0.81 and an activity (measured as per cent conversion of gas oil to 410° end point gasoline) of 11.6.

*Example 2.*—About 60 grams of 8–14 mesh active alumina were soaked at room temperature for 20 hours in 100 ml. of a solution containing 5.0% HF, 60% $H_3PO_4$ and 35% $H_2O$. A clear supernatant liquid layer was separated from the solid and a liquid layer containing suspended solid particles. The latter was filtered, washed and dried at 212° F. for 2 hours and 1000° F. for 2 hours. The product showed an apparent density of 0.81 and a cracking activity of 16.1.

*Example 3.*—The product from Example 2 was retreated by soaking in a solution of 10 gm. HF (48% aq.), 10 gm. $H_3PO_4$ in 80 gm. ethanol at room temperature for 24 hours. After pouring off the supernatant liquid, the solid was dried for several hours at 200° F. and overnight at 1000° F. The apparent density was 0.89; activity—27.1.

*Example 4.*—About 60 gm. 8–14 mesh active alumina were covered with a solution containing 15 gm. ethyl ortho silicate (4.5 gm. $SiO_2$) in 50 cc. of ethanol. After standing overnight at room temperature, the supernatant liquid was poured off and the adsorbed ethyl silicate was then hydrolyzed by heating with water for several hours at 200° F. The product was then dried overnight at 200° F. and then for several hours at 1000° F. Apparent density—0.83; activity—2.9.

*Example 5.*—The alumina was ground to less than 100 mesh and 68 gm. of the powder were dispersed in a solution consisting of 50 cc. ethyl orthosilicate (12 gm. $SiO_2$), 75 cc. ethanol, 12 cc. 4N nitric acid with rapid agitation. To this was added 100 ml. of 1N ammonium hydroxide, very slowly, with rapid agitation. After all the ammonia was added, the sol gelled very rapidly. The product was dried for several hours at 200° F. and overnight at 1000° F. Apparent density—0.50; activity—39.6.

*Example 6.*—The product of Example 4 was again soaked overnight in alcoholic ethyl orthosilicate. The soaking solution was 20 cc. $Et_4SiO_4$ (5 gm. $SiO_2$) in 30 cc. of ethanol. This was allowed to stand overnight at room temperature and was then finished as in Example 4. The results seem to indicate that the impregnation in Example 4 was inadequate: apparent density—0.83; activity—34.1.

*Example 7.*—A 50 gm. sample of the pulverized alumina was dispersed in 40 cc. of water. A sol was made up by adding 30 cc. water glass (0.213 gm. $SiO_2$/cc.) with very vigorous stirring to 80 ml. 1N HCl. This sol was then added immediately with very vigorous stirring to the water dispersion of alumina. A gel formed in about 15 seconds after mixing was complete. The activated alumina was thus dispersed throughout a gel in which the alumina predominated. The gel was broken up, washed five times with 5% ammonium chloride solution to remove sodium and washed free of chloride ions. The washed gel was then dried for several hours at 200° F. and then overnight at 1000° F. Apparent density—0.55; activity—33.3.

*Example 8.*—A 50 gm. sample of the pulverized alumina was dispersed in 50 cc. of water and a freshly prepared sol made by adding 40 ml. water glass (0.213 gm. $SiO_2$ cc.) to 60 ml. 1N HCl was added with vigorous stirring. The resultant mixture was quite alkaline and gelation was slow, requiring about 15 minutes. The gel which formed was similar to that of Example 7 and was treated in similar manner. Apparent density—0.56; activity—37.4.

*Example 9.*—Thirty cubic centimeters of water glass (0.213 gm. $SiO_2$/cc.) was added to 50 gm. of 8–14 mesh active alumina which completely adsorbed the water glass. After 10 minutes the alumina was covered with 3N hydrochloric acid and allowed to stand overnight. The supernatant liquid was then poured off and the material washed with 5% ammonium chloride solution five times. The composite granules were washed to remove chloride ions and dried as above. Apparent density—0.88; activity 29.6

*Example 10.*—To a solution containing 30 cc. water glass (0.213 gm. $SiO_2$/cc.), 40 cc. 1N hydrochloric acid and 50 cc. of water was added 50 gm. 8–14 mesh alumina. The mixture was allowed to stand overnight at room temperature and the supernatant liquid decanted. The remaining solids were washed five times with 5% aqueous ammonium chloride and then washed free of chloride ions with distilled water. The washed product was dried as above. Apparent density—0.87; activity 44.5.

*Example 11.*—The product of Example 6 was soaked 24 hours at room temperature in a solution consisting of 10 gm. HF (48% aq.), 10 gm. $H_3PO_4$ and 80 gm. ethanol. The supernatant liquid was then poured off and the treated material dried for several hours at 200° F. followed by four hours at 1000° F. Apparent density—0.88; activity—50.3.

*Example 12.*—Approximately 60 gm. of 8–14 mesh active alumina was treated exactly as in Example 4 except that after drying at 200° F. for several hours, the material was soaked overnight at room temperature in a solution consisting of 5 gm. HF, 45 gm. ethanol and 50 gm. water. The clear supernatant liquid was then poured off and the product dried at 200° F. for three hours followed by 1000° F. overnight. Apparent density—0.84; activity—46.2.

*Example 13.*—The alumina was treated as in Example 12 except that the treating solution consisted of 10 gm. HF (48% aq.), 10 gm. $H_3PO_4$ and 80 gm. ethanol. Apparent density—0.91; activity—42.6.

*Example 14.*—Approximately 60 gm. 8–14 mesh active alumina was treated exactly as in Example 4 except that after drying for several hours at about 200° F., the product was soaked in a solution composed of 35 cc. $BF_3$-etherate and 35 cc.

ethyl ether for 24 hours at room temperature. The supernatant liquid was then poured off and the product dried at 200° F. for several hours and overnight at 1000° F. Results: per cent 410° gasoline—42.6; apparent density—0.91.

*Example 15.*—Approximately 60 gm. 8–14 mesh active alumina was soaked overnight at room temperature in 100 ml. of a solution containing 5% HF, 60% $H_3PO_4$ and 35% $H_2O$ (by weight). The supernatant liquid was poured off and the solid granules dried for one hour at 212° F. The granules were then soaked overnight in a solution composed of 7 gm. ethyl silicate (2.1 gm. $SiO_2$) and 50 ml. ethanol. Then 50 ml. of water was added and the mixture heated at 200° F. until completely dry. It was then heated overnight at 1000° F. Apparent density—0.84; activity—34.4.

TABLE

*Cracking activity of catalysts from $Al_2O_3$*

| Example | Space Velocity | Vol. Per Cent 300° F. Gasoline | Vol. Per Cent 410° Gasoline |
|---|---|---|---|
| 1 | 1.5 | | 0.7 |
| 2 | 1.5 | 3.1 | 11.6 |
| 3 | 1.5 | 9.2 | 16.1 |
| 4 | 1.88 | 16.7 | 27.1 |
| 5 | 1.5 | 0.0 | 2.9 |
| 6 | 1.5 | 29.8 | 39.6 |
| 7 | 1.5 | 23.7 | 34.1 |
| 8 | 1.5 | 16.3 | 33.3 |
| 9 | 1.5 | 24.4 | 37.4 |
| 10 | 1.6 | 18.5 | 29.6 |
| 11 | 1.64 | 31.6 | 44.5 |
| 12 | 1.6 | 37.2 | 50.3 |
| 13 | 1.5 | 34.1 | 46.2 |
| 14 | 1.5 | 32.1 | 46.4 |
| 15 | 1.5 | 30.5 | 42.6 |
|  | 1.67 | 23.2 | 34.4 |

I claim:

1. A process for conversion of hydrocarbons which comprises contacting hydrocarbon vapors at conversion conditions of temperature and pressure with a catalytic composition prepared by a process which comprises depositing silica on active alumina and thereafter treating the composite so produced with a mixture of hydrogen fluoride and phosphoric acid.

2. A process for conversion of hydrocarbons which comprises contacting hydrocarbon vapors at conversion conditions of temperature and pressure with a catalytic composition prepared by a process which comprises depositing silica on active alumina and thereafter treating the composite so produced with an alcoholic solution of hydrogen fluoride and phosphoric acid.

CHARLES J. PLANK.

REFERENCES CITED

The following references are of record in the file of this patent:

UNITED STATES PATENTS

| Number | Name | Date |
|---|---|---|
| 2,216,262 | Bloch et al. | Oct. 1, 1940 |
| 2,267,767 | Thomas | Dec. 30, 1941 |
| 2,307,878 | Connolly | Jan. 12, 1943 |
| 2,317,803 | Reeves | Apr. 27, 1943 |
| 2,336,165 | Connolly | Dec. 7, 1943 |
| 2,356,303 | Connolly | Aug. 22, 1944 |
| 2,154,527 | Pier et al. | Apr. 18, 1939 |
| 2,322,622 | Fischer et al. | June 22, 1943 |
| 2,348,599 | Brown | May 9, 1944 |
| 2,348,624 | Hillman | May 9, 1944 |